United States Patent
Watanabe et al.

(10) Patent No.: US 8,871,392 B2
(45) Date of Patent: Oct. 28, 2014

(54) FUEL CELL SYSTEM

(75) Inventors: Nobuo Watanabe, Susono (JP); Keigo Suematsu, Susono (JP); Tatsuaki Yokoyama, Susono (JP); Katsuhiko Hirose, Niwa-gun (JP); Atsushi Matsuba, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1250 days.

(21) Appl. No.: 12/310,021

(22) PCT Filed: Aug. 8, 2007

(86) PCT No.: PCT/JP2007/065511
§ 371 (c)(1),
(2), (4) Date: Apr. 22, 2009

(87) PCT Pub. No.: WO2008/018497
PCT Pub. Date: Feb. 14, 2008

(65) Prior Publication Data
US 2009/0325013 A1 Dec. 31, 2009

(30) Foreign Application Priority Data
Aug. 9, 2006 (JP) .................................. 2006-217190

(51) Int. Cl.
*H01M 8/00* (2006.01)
*H01M 8/04* (2006.01)
*H01M 8/06* (2006.01)
*H01M 8/10* (2006.01)

(52) U.S. Cl.
CPC ...... *H01M 8/04298* (2013.01); *H01M 8/04007* (2013.01); *H01M 2008/1095* (2013.01); *H01M 8/04223* (2013.01); *H01M 8/04141* (2013.01); *H01M 8/0662* (2013.01); *Y02E 60/50* (2013.01); *H01M 8/04731* (2013.01); *H01M 8/04365* (2013.01); *H01M 8/04201* (2013.01); *H01M 8/04089* (2013.01)
USPC ............................. 429/400; 429/430; 429/431

(58) Field of Classification Search
CPC ........................ Y02E 60/50; H01M 2008/1095
USPC .......................................................... 429/428
See application file for complete search history.

(56) References Cited

U.S. PATENT DOCUMENTS

| 2003/0126796 A1 | 7/2003 | Hibino et al. | |
|---|---|---|---|
| 2003/0203248 A1* | 10/2003 | Bruck et al. | ............. 429/13 |
| 2004/0072050 A1 | 4/2004 | Miura et al. | |
| 2005/0241233 A1* | 11/2005 | Hibino et al. | ............. 48/195 |

FOREIGN PATENT DOCUMENTS

| JP | A-2003-201487 | 7/2003 |
|---|---|---|
| JP | A-2004-111167 | 4/2004 |
| JP | A-2004-134273 | 4/2004 |
| JP | T-2004-513486 | 4/2004 |
| JP | A-2005-203108 | 7/2005 |

* cited by examiner

*Primary Examiner* — Ula C. Ruddock
*Assistant Examiner* — Archer Dudley
(74) *Attorney, Agent, or Firm* — Oliff PLC

(57) ABSTRACT

A fuel cell system includes a hydrogen path for supplying odorant-added hydrogen to the fuel cell, an estimating unit to estimate the depositing of the odorant in the fuel cell, and control unit to heat the fuel cell up to a temperature at which at least part of the odorant deposited in the fuel cell evaporates when the depositing of the odorant is estimated.

9 Claims, 8 Drawing Sheets

FUEL CELL SYSTEM

This is a PCT National Phase of International Application No. PCT/JP2007/065511 filed Aug. 8, 2007, which claims the benefit of Japanese Application No. 2006-217190 filed Aug. 9, 2006. The disclosure of the prior applications is hereby incorporated by reference herein in its entirety.

TECHNICAL FIELD

The present invention relates to a fuel cell system for supplying odorant-added (odorant-mixed) hydrogen to a fuel cell.

BACKGROUND ART

Conventionally, there is disclosed that odorant-mixed hydrogen is supplied to a fuel cell for power generation (for example, Patent Document 1). Since hydrogen supplied as a fuel to the fuel cell is odorless, the odorant is mixed into hydrogen to allow early detection of hydrogen leakage.
Patent Document 1: JP 2004-134273 A

DISCLOSURE OF THE INVENTION

Problem to be Solved by the Invention

In a system for supplying odorant-mixed hydrogen to the fuel cell for power generation, the odorant is supplied in a vaporized state together with hydrogen to the fuel cell. When hydrogen is consumed in the fuel cell, a concentration of the odorant increases in the fuel cell. If a temperature of the fuel cell is equal to or lower than a boiling point of the odorant at this time, a part of the odorant is condensed (liquefied). Therefore, when the fuel cell is continuously in a low temperature state, there is a possibility that the condensed odorant is adhered and solidified in the fuel cell to be deposited therein. There is a possibility in that the deposited odorant becomes a factor of preventing appropriate power generation of the fuel cell.

An object of the present invention is to provide a fuel cell system capable of restraining an odorant deposited in a fuel cell from inhibiting power generation of the fuel cell.

Means for solving the Problem

In order to solve the above-mentioned problem, the present invention adopts the following configuration.

Specifically, a fuel cell system of the present invention includes:

a hydrogen supply path for supplying odorant-added hydrogen to a fuel cell;

an estimation unit configured to estimate deposition of an odorant in the fuel cell; and a control unit configured to elevate a temperature of the fuel cell to a temperature allowing at least a part of the odorant deposited in the fuel cell to be vaporized when the deposition of the odorant is estimated.

According to the present invention, when the deposition of the odorant in the fuel cell is estimated, the temperature of the fuel cell is elevated to a temperature which allows at least a part of the odorant to be vaporized. As a result, the deposited odorant can be vaporized to be easily discharged from the fuel cell. Therefore, it is possible to restrain the odorant deposited in the fuel cell from inhibiting the power generation of the fuel cell.

Preferably, the estimation unit of the present invention counts a time in which the temperature of the fuel cell does not exceed a predetermined temperature during an operation time of the fuel cell, and estimates the deposition of the odorant when a count value exceeds a predetermined time.

Preferably, the estimation unit of the present invention keeps the count value at time of stop when an operation of the fuel cell is stopped while the time is being counted, and restarts counting the time while using the kept count value as an initial value when the operation of the fuel cell is thereafter restarted.

Preferably, the estimation unit of the present invention measures an integrated value of a supplied hydrogen quantity to the fuel cell during the operation time of the fuel cell, and estimates the deposition of the odorant in a case where the temperature of the fuel cell does not exceed the predetermined temperature when the supplied hydrogen quantity integrated value reaches a predetermined value.

Preferably, the estimation unit of the present invention keeps the supplied hydrogen quantity integrated value at time of stop when the operation of the fuel cell is stopped during a measurement of the supplied hydrogen quantity integrated value, and restarts measuring the supplied hydrogen quantity integrated value while using the kept supplied hydrogen quantity integrated value as an initial value when the operation of the fuel cell is thereafter restarted.

Preferably, the estimation unit of the present invention measures a generated current integrated value of the fuel cell during an operation time of the fuel cell, and estimates the deposition of the odorant in a case where the temperature of the fuel cell does not exceed a predetermined temperature when the generated current integrated value reaches a predetermined value.

Preferably, the estimation unit of the present invention keeps the generated current integrated value at time of stop when an operation of the fuel cell is stopped during a measurement of the generated current integrated value, and restarts measuring the generated current integrated value while using the kept generated current integrated value as an initial value when the operation of the fuel cell is thereafter restarted.

As described above, the estimation unit is capable of estimating the deposition of the odorant if a state where the temperature of the fuel cell is not elevated to a predetermined temperature continues for a predetermined period of time or if the temperature of the fuel cell is not elevated to the predetermined temperature at the time when the supplied hydrogen quantity integrated value or the generated current integrated value reaches the predetermined value. Moreover, by adopting a configuration in which the supplied hydrogen quantity integrated value and the generated current integrated value are not reset by the stop of the operation of the fuel cell during a period in which the temperature is not elevated to the predetermined temperature, the deposition of the odorant can be appropriately estimated.

Preferably, upon start of the temperature elevation of the fuel cell, the control unit of the present invention warms up the fuel cell to allow the continuation of a state where the temperature of the fuel cell is elevated to be equal to or higher than a temperature allowing at least a part of the odorant to be vaporized. In this manner, the odorant in the fuel cell can be appropriately vaporized.

Further, in the present invention, an odorant deposition estimating apparatus in a fuel cell, including: temperature measurement unit configured to measure a temperature of the fuel cell during an operation; and estimation means for using the measured temperature to estimate deposition of an odorant supplied together with hydrogen to the fuel cell in the fuel cell, can be realized.

EFFECTS OF THE INVENTION

According to the present invention, the odorant deposited in the fuel cell can be prevented from inhibiting the power generation of the fuel cell.

DESCRIPTION OF REFERENCE NUMERALS

Figure 1:
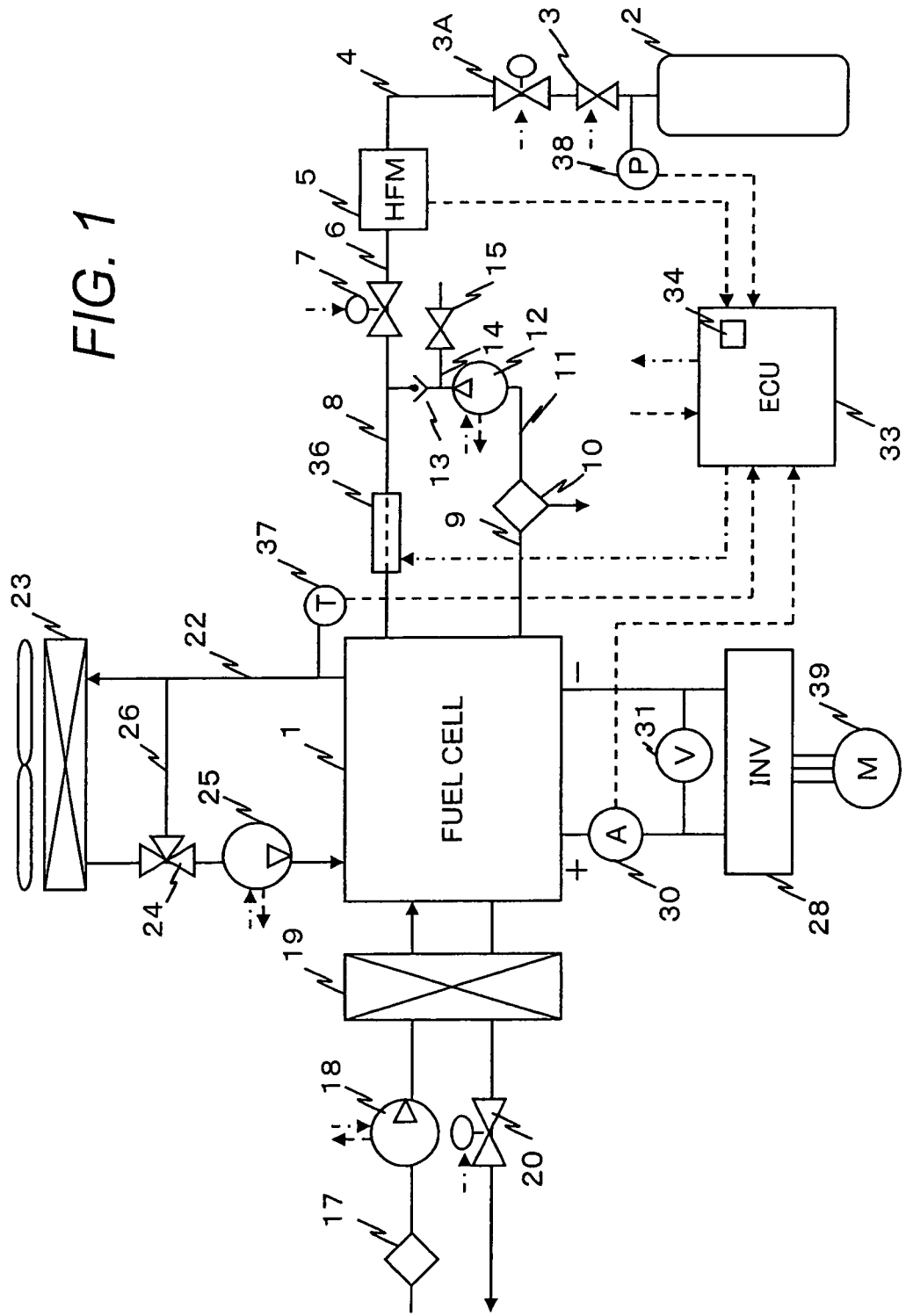
FIG. 1 is an explanatory view illustrating a configuration example of a fuel cell system according to a first embodiment of the present invention.

1 . . . fuel cell
2 . . . hydrogen tank (high-pressure hydrogen tank)
3 . . . valve
3A . . . pressure regulating valve
4, 6, 8, 9, 11, 22 . . . pipe
5 . . . hydrogen flow meter (HFM)
7 . . . electromagnetic valve
10 . . . gas-liquid separator
12 . . . circulating pump
13 . . . check valve
14 . . . branch pipe
15 . . . exhaust valve
17 . . . air cleaner
18 . . . air compressor (pump)
19 . . . humidification module
20 . . . back-pressure regulating valve
23 . . . radiator
24 . . . three-way valve
25 . . . pump
26 . . . bypass pipe
28 . . . inverter
29 . . . motor
30 . . . ammeter (current sensor)
31 . . . voltmeter
33 . . . ECU
34 . . . non-volatile memory
36 . . . heater
37 . . . temperature sensor
38 . . . pressure sensor

BEST MODE FOR CARRYING OUT THE INVENTION

Hereinafter, embodiments of the present invention will be described referring to the drawings. The construction of the embodiment is given only by way of example, and therefore, the present invention is not limited to the construction of the embodiments.

<Schema of Embodiment>

In the embodiment of a fuel cell system, in order to prevent an odorant for a hydrogen gas from being deposited in a fuel cell, the fuel cell is forcibly warmed up: (1) when a temperature of the fuel cell is not elevated to a predetermined temperature within a predetermined period of time; (2) when the temperature of the fuel cell is not elevated to the predetermined temperature before a consumed hydrogen quantity (supplied hydrogen quantity) reaches a predetermined value; and (3) when the temperature of the fuel cell is not elevated to the predetermined temperature before a generated current integrated value reaches a predetermined value.

<Configuration Example of Fuel Cell System>

FIG. 1 is a view illustrating a configuration example of the fuel cell system to which the present invention is applied. The fuel cell system shown in FIG. 1 is installed in, for example, a vehicle. It is apparent that the fuel cell system according to the present invention is also applicable to a stationary fuel cell system. In FIG. 1, a polymer electrolyte fuel cell (PEFC) is adopted as a fuel cell 1. It is apparent that the fuel cell to which the present invention is applicable is not limited to the PEFC.

The fuel cell 1 includes a cell stack including a plurality of stacked cells. Each of the cells is composed of a polymer electrolyte membrane, a fuel electrode (anode) and an air electrode (oxidizer electrode; cathode) which interpose the polymer electrolyte membrane from both sides, and a fuel electrode side separator and an air electrode side separator interposing the fuel electrode and the air electrode.

The fuel electrode includes a diffusion layer and a catalytic layer. A fuel containing hydrogen such as a hydrogen gas or a hydrogen rich gas is supplied to the fuel electrode by a fuel supply system. The fuel supplied to the fuel electrode is diffused in the diffusion layer to reach the catalytic layer. In the catalytic layer, hydrogen is separated into protons (hydrogen ions) and electrons. The hydrogen ions pass through the polymer electrolyte membrane to move to the air electrode, whereas the electrons pass through an external circuit to move to the air electrode.

On the other hand, the air electrode includes a diffusion layer and a catalytic layer, and an oxidizer gas such as air is supplied to the air electrode by an oxidizer supply system. The oxidizer gas supplied to the air electrode is diffused in the diffusion layer to reach the catalytic layer. In the catalytic layer, water is generated by a reaction between the oxidizer gas, the hydrogen ions having passed through the polymer electrolyte membrane to reach the air electrode, and the electrons having passed through the external circuit to reach the air electrode. The electrons passing through the external circuit upon the reactions at the fuel electrode and the air electrode as described above are used as electric power for a load connected between both terminals of the cell stack of the fuel cell 1.

A fuel supply/discharge system for supplying the fuel and an oxidizer supply/discharge system for supplying and discharging the oxidizer are connected to the fuel cell 1. In FIG. 1, the fuel supply/discharge system is configured as follows.

Specifically, as the fuel supply system, a tank 2 storing a high-pressure hydrogen gas, a valve 3 for controlling supply/stop of supply of hydrogen from the tank 2, a pressure regulating valve 3A, a hydrogen flow meter (HFM) 5 connected to the pressure regulating valve 3A through a pipe 4, and an electromagnetic valve 7 connected to the HFM 5 through a pipe 6 are included. The electromagnetic valve 7 is connected to a fuel inlet of the fuel cell 1 through a pipe 8. With such a configuration, when the valve 3 is opened, the hydrogen gas from the tank 2 is fed from the valve 3. After a pressure is regulated by the pressure regulating valve 3A, the hydrogen gas passes through the pipe 8 to be supplied into the fuel cell 1. The HFM 5 measures a flow rate of the hydrogen gas passing therethrough. The electromagnetic valve 7 supplies/stops supplying the hydrogen gas to the pipe 8.

On the other hand, the fuel discharge system is configured as follows. A fuel outlet provided for the fuel cell 1 is connected to an inlet of a gas-liquid separator 10 through a pipe 9. An outlet of the gas-liquid separator 10 is connected to an inlet of a circulating pump 12 through a pipe 11. An outlet of the circulating pump 12 is connected to an intermediate part of the pipe 8 through a check valve 13. A branch pipe 14 is connected between the circulating pump 12 and the check valve 13. An exhaust valve 15 is connected to the branch pipe 14. With such a configuration, the fuel discharge system is connected to the pipe 8 to constitute a circulation path, and is configured to allow the hydrogen gas to circulate in the circulation path by driving the circulating pump 12. A concentration of hydrogen flowing through the circulation path is regulated by opening/closing the electromagnetic valve 7 and the exhaust valve 15. Moreover, moisture is removed from the hydrogen gas (discharged gas) discharged from the fuel cell 1 to the pipe 9 when the hydrogen gas passes through the gas-liquid separator 10. The removed moisture is discharged from a drain (not shown) to the exterior. At the downstream of the exhaust valve 15, a dilution device (not shown) is connected. The hydrogen gas having passed through the exhaust valve 15 is released into an atmosphere after being diluted by the dilution device.

The oxidizer supply/discharge system is configured as follows. The oxidizer supply system includes an air cleaner 17, an air compressor (pump) 18 connected to the air cleaner 17, and a humidification module 19 connected to the pump 18. The humidification module 19 is connected to an oxidizer inlet of the fuel cell 1. The oxidizer discharge system is configured as follows. An oxidizer outlet provided for the fuel cell 1 is connected to the humidification module 19. The humidification module 19 is connected to a back-pressure regulating valve 20. According to such an oxidizer supply/discharge system, by driving the air compressor 18, after passing through the air cleaner 17 and the air compressor 18 to be humidified by the humidification module 19, air (oxidizer gas) in the atmosphere is supplied to the fuel cell 1. The oxidizer gas (air) discharged from the fuel cell 1 is discharged into the atmosphere after passing through the humidification module 19 and the back-pressure regulating valve 20.

In FIG. 1, a cooling system for the fuel cell 1 is further illustrated. The cooling system is configured as follows. One end of a pipe 22 is connected to an outlet of a coolant passage provided for the fuel cell 1. The other end of the pipe 22 is connected to an inlet of a radiator 23. An outlet of the radiator 23 is connected to a three-way valve 24. The three-way valve 24 includes a first inlet, a second inlet, and an outlet. The first inlet is connected to the outlet of the radiator 23, the second inlet is connected to an intermediate part of the pipe 22 through a bypass pipe 26, and the outlet is connected to an inlet of a pump 25. An outlet of the pump 25 is connected to an inlet of the coolant passage provided for the fuel cell 1.

According to such a cooling system, by driving the pump 25, coolant fed from the pump 25 passes through the coolant passage in the fuel cell 1 to be discharged to the pipe 22. If a temperature of the fuel cell 1 is higher than a temperature of the coolant, heat of the fuel cell 1 shifts to the coolant to cool the fuel cell 1. The coolant discharged to the pipe 22 passes through any one of a first route through the radiator 23 and a second route through the bypass pipe 26 depending on a state of the three-way valve 24 to be fed again from the pump 25 to the fuel cell 1. More specifically, in the state where the first inlet of the three-way valve 24 is opened and the second inlet is closed, the coolant in the pipe 22 passes through the first route to be cooled by the radiator 23. On the other hand, in the state where the first inlet of the three-way valve 24 is closed and the second inlet is opened, the coolant in the pipe 22 passes through the second route to pass through the bypass pipe 26 without passing through the radiator 23 to be fed from the outlet of the three-way valve 24 to the pump 25.

The three-way valve 24 is constituted by, for example, an electromagnetic valve. The opening/closure of the first and second inlets is controlled by a control signal. It is apparent that it is also possible to adopt a configuration in which the three-way valve 24 includes a temperature sensitive actuator (thermostat) which is driven according to the temperature of the coolant to automatically control the opening/closure of the first and second inlets.

FIG. 1 illustrates a load structure of the fuel cell 1 by way of example. In FIG. 1, an inverter 28 is connected in series to the fuel cell 1. A DC output from the fuel cell 1 is converted into an AC output by the inverter 28. The AC output is supplied to a motor 29 for transferring power to, for example, a drive wheel of the vehicle in which the fuel cell system is installed. Moreover, an ammeter (current sensor) 30 is connected in series and a voltmeter 31 is connected in parallel between the fuel cell 1 and the inverter 28. Moreover, the fuel cell 1 is connected to a battery (not shown), and is configured to allow the battery to be charged with excessive power.

Further, the fuel cell system illustrated in FIG. 1 includes a control system for controlling operations of the fuel supply/discharge system, the oxidizer supply/discharge system, and the cooling system described above. The control system includes an electronic control unit (ECU) 33. The ECU 33 is composed of a central processing unit (CPU), a storage device, a non-volatile memory 34, an input/output interface (I/O), and the like. An operation of each system is controlled by the execution of a program stored in the storage device by the CPU.

In the example illustrated in FIG. 1, the ECU 33 controls operations of the valve 3, the pressure regulating valve 3A, the electromagnetic valve 7, the pump 12, and the exhaust valve 15 in the fuel supply/discharge system. The ECU 33 also controls ON/OFF of a heater 36 provided for a part of the pipe 8, which constitutes the circulation path. The ECU 33 also controls operations of the air compressor 18 and the back-pressure regulating valve 20 in the oxidizer supply/discharge system. Moreover, the ECU 33 controls an operation of the pump 25 in the cooling system.

Moreover, the ECU 33 is configured to allow physical quantities regarding the respective systems to be input as various sensor outputs provided for the fuel cell system. Each of the sensor outputs (physical quantities) is used for executing the program.

In the example illustrated in FIG. 1, a temperature sensor 37 for detecting the temperature of the coolant in the pipe 22 in the vicinity of the coolant outlet of the fuel cell 1 is provided. The ECU 33 is configured to receive the temperature of the coolant from the temperature sensor 37 as a temperature of the fuel cell 1 (FC temperature). Moreover, a pressure sensor 38 for detecting an internal pressure of the tank 2 is provided at an outlet of the tank 2. The ECU 33 is configured to receive a sensor output (tank internal pressure) from the pressure sensor 38. Moreover, the ECU 33 is configured to receive the flow rate of the hydrogen gas from the HFM 5. Further, the ECU 33 is configured to allow a current value measured by the ammeter 30 or a voltage value measured by the voltmeter 31 to be input thereto.

In the configuration of the fuel cell system as described above, an odorant is added to the hydrogen gas to facilitate the detection of the leakage (outflow) of the hydrogen gas. In the example illustrated in FIG. 1, the odorant-added hydrogen gas is stored in the tank 2. It is apparent that a configuration may be such that the odorant is supplied to at least one of the pipes 4, 6, and 8 (preferably, to the upstream side of the HFM 5). In this case, a hydrogen storage alloy (MH) tank or a liquid hydrogen tank may be adopted as a hydrogen tank.

As the odorant, a material having a boiling point which does not damage the fuel cell 1, preferably, a material having a boiling point under an operation temperature of the fuel cell is adopted. In this embodiment, in view of an operation temperature of the PEFC (up to about 80° C.), cyclohexane (a melting point of 6.5° C. and a boiling point of 80.7° C.) is adopted as the odorant. It is apparent that a material having a melting point and a boiling point suitable for the type (operation temperature) of the fuel cell 1 is adopted as the odorant. Cyclohexane is a known odorant disclosed in, for example, Japanese Patent Application Laid-open No. 2003-155488.

The odorant-added hydrogen gas at about a saturated vapor pressure is supplied to the fuel cell 1 by the fuel supply system. The fuel supply system functions as a hydrogen supply path for supplying odorant-added hydrogen to the fuel cell. When hydrogen is consumed in the fuel cell 1 for power generation, a concentration of the odorant increases. If the temperature of the fuel cell 1 is equal to or lower than the boiling point of the odorant at this time, there is a possibility that the odorant is liquefied (builds up condensation) in the fuel cell 1 and then is solidified to adhere to the interior of the fuel cell 1 to be deposited therein. In this case, there is a possibility that the deposited odorant blocks a hydrogen gas flow path in the fuel cell 1 or inhibits an electrode reaction in the diffusion layer to prevent appropriate power generation of the fuel cell 1.

In the storage device of the ECU 33, a control program for restraining the inhibition of power generation due to the deposition of the odorant as described above is stored. By executing the control program, control for estimating the deposition of the odorant to perform a forced warm-up operation for vaporizing the deposited odorant is executed.

CONTROL EXAMPLE 1

Next, a first control example (control example 1) for estimating the deposition of the odorant to perform a forced warm-up operation by the ECU 33 will be described. The schema of a configuration regarding the control example 1 is as follows.

(1) A unit (temperature sensor 37) configured to measure the temperature of the fuel cell 1, a unit (for example, ECU 33) configured to measure the operation time of the fuel cell 1, an estimation unit (for example, ECU 33) configured to estimate the deposition of the odorant when the temperature of the fuel cell 1 does not reach a predetermined temperature or higher even though the operation of the fuel cell 1 is continued for a predetermined time, and a control unit (for example, ECU 33) configured to forcibly elevate the temperature of (warming up) the fuel cell 1 when the deposition of the odorant is estimated are included.

(2) The forced warm-up operation is continued for a certain period of time even after the temperature of the fuel cell 1 reaches the predetermined temperature.

(3) In the case where the operation of the fuel cell 1 is terminated before the temperature reaches the predetermined temperature, an operation time at the time of termination is stored in the storage device (non-volatile memory 34). At the restart of the fuel cell 1, the operation time at the previous termination of the operation is set as an initial value of the operation time.

Figure 2:
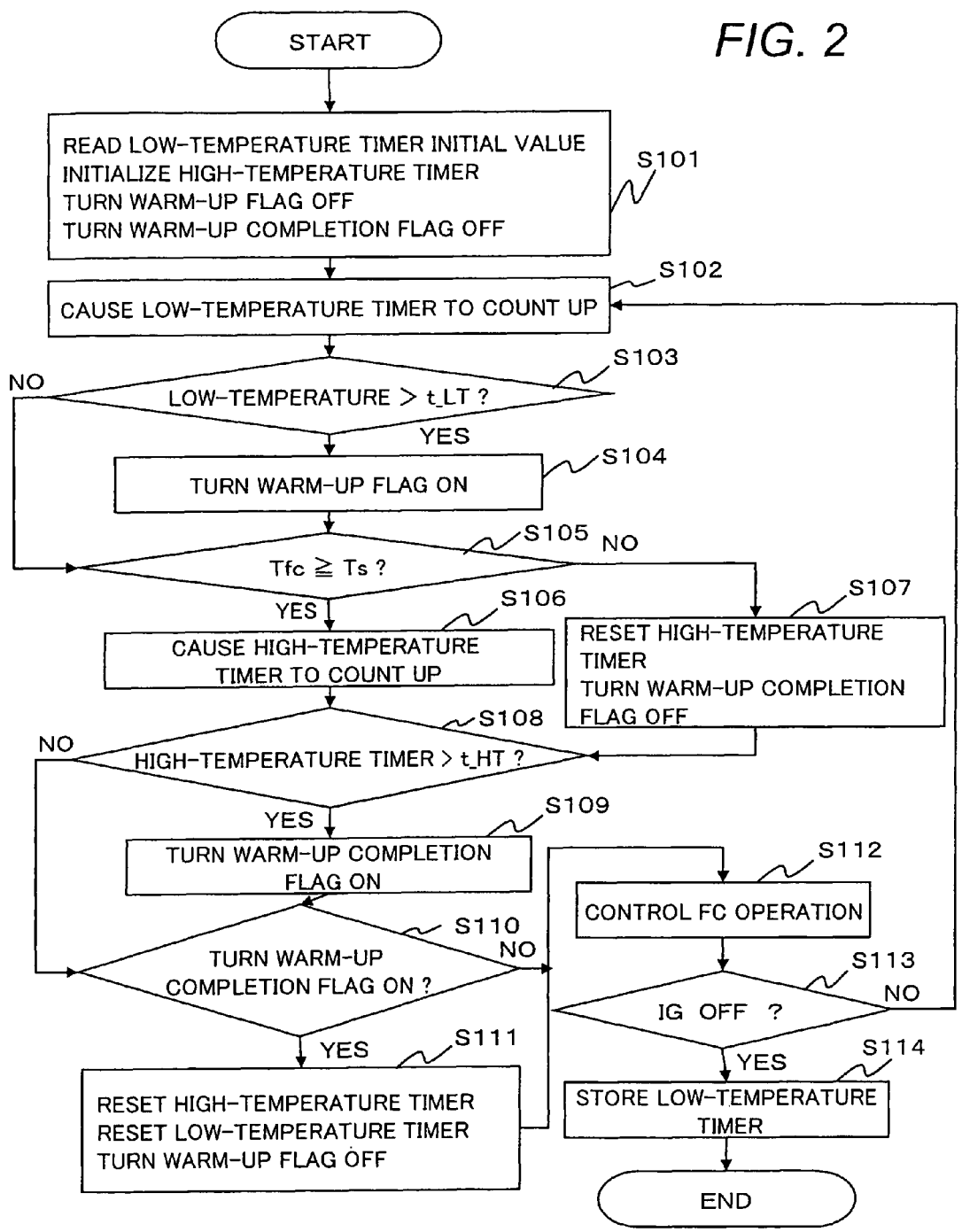
FIG. 2 is a flowchart illustrating an example (control example 1) of forced warm-up operation control of a fuel cell based on estimation of deposition of an odorant by an ECU.

FIG. 2 is a flowchart illustrating the control example 1 by the ECU 33. The ECU 33 includes a low-temperature timer (first timer) and a high-temperature timer (second timer) for executing the control example 1, and is configured to store set values (ON/OFF) of a warm-up flag and a warm-up completion flag on the storage device. Further, the ECU 33 includes the non-volatile memory 34 such as an EEPROM. A low-temperature timer value at the previous termination (when the fuel cell 1 is stopped for the last time) is stored in the non-volatile memory 34. Processing illustrated in FIG. 2 is started when, for example, an ignition coil (IG) of the vehicle is turned ON to start the fuel cell 1. Therefore, the ECU 33 is configured to receive an ON/OFF signal of the IG to store and manage a value indicating ON/OFF of the IG (IG flag value) in the storage device.

In Step S101 illustrated in FIG. 2, upon start of the fuel cell 1, the ECU 33 initializes the warm-up flag, the warm-up completion flag, and the high-temperature timer. Specifically, values of the warm-up flag and the warm-up completion flag are set to OFF, whereas an initial value of the high-temperature timer is set to "0". At this time, the ECU 33 reads the value of the low-temperature timer at the previous termination, which is stored in the non-volatile memory 34, as the initial value of the low-temperature timer. When the value of the low-temperature timer is not stored in the non-volatile memory 34, "0" is set for the low-temperature timer as the initial value.

In next Step S102, the ECU 33 causes the low-temperature timer to start counting up (timing by the low-temperature timer).

In next Step S103, the ECU 33 judges whether or not the value of the low-temperature timer has exceeded a low-temperature duration time threshold value t_LT (prestored on the storage device) (Step S103). At this time, when the value of the low-temperature timer exceeds the threshold value t_LT (S103; YES), the processing proceeds to Step S104. When the value of the low-temperature timer does not exceed the threshold value t_LT (S103; NO), the processing proceeds to Step S105.

In next Step S104, upon satisfaction of the condition in Step 103, the ECU 33 sets the value of the warm-up flag to ON. Specifically, in the control example 1, the deposition of the odorant in the fuel cell 1 is estimated based on the satisfaction of the condition in Step 103.

In Step S105, the ECU 33 uses the temperature sensor 37 to measure a fuel cell temperature (FC temperature), and judges whether or not the FC temperature is equal to or higher than an FC temperature threshold value Ts (prestored on the storage device).

At this time, when the condition in Step S105 is satisfied (S105; YES), the ECU 33 causes the high-temperature timer to start counting up (timing by the high-temperature timer) (Step S106). Thereafter, the processing proceeds to Step S108.

On the other hand, when the condition in Step S105 is not satisfied (S105; NO), the ECU 33 resets the high-temperature timer and the warm-up completion flag (Step S107). Specifically, the ECU 33 causes the high-temperature timer to stop counting up and sets the value of the warm-up completion flag to OFF. Thereafter, the processing proceeds to Step S108.

In Step S108, the ECU 33 judges whether or not the count value of the high-temperature timer has exceeded a high-temperature duration time threshold value t_HT. At this time, when the condition in Step S108 is satisfied (S108; YES), the ECU 33 sets the warm-up completion flag to ON (Step S109), and allows the processing to proceed to Step 110. When the condition in Step S108 is not satisfied (S108; NO), the processing proceeds to Step S110.

In Step S110, the ECU 33 judges whether or not the value of the warm-up completion flag is ON. When the condition in Step S110 is satisfied (warm-up completion flag ON: S110; YES), the ECU 33 resets the high-temperature timer, the low-temperature timer, and the warm-up flag (Step S111). Specifically, the timing by the high-temperature timer and the low-temperature timer is stopped, whereas the value of the warm-up flag is set to OFF. Thereafter, the processing proceeds to Step S112. When the condition in Step S110 is not satisfied (warm-up completion flag OFF: S110; NO), the processing also proceeds to Step S112.

In Step S112, the ECU 33 controls the operation of the fuel cell 1 according to the ON/OFF states of the warm-up flag and the warm-up completion flag. For example, when the warm-up flag is ON and the warm-up completion flag is OFF, the ECU 33 forcibly elevates the temperature of the fuel cell 1.

For example, the ECU 33 increases the amount of power generated by the fuel cell 1. For example, the ECU 33 puts the battery into a chargeable with a current output from the fuel cell 1. Specifically, a load of the fuel cell 1 is increased to cause the fuel cell 1 to generate heat.

Alternatively, the heater 36 attached to the pipe 8 or a heater attached in the fuel cell 1 (for example, to the separator) is caused to generate heat to elevate the temperature of the fuel cell 1. Specifically, the fuel gas or the fuel cell 1 itself is heated to attempt the temperature elevation.

Further alternatively, a configuration can also be such that the oxidizer gas is directly introduced to the fuel electrode (anode) of the fuel cell 1 to elevate the temperature of the fuel cell 1 with heat of reaction at the fuel electrode. In this case, for example, although not illustrated in FIG. 1, a configuration, in which a part of the oxidizer gas (air) supplied to the air electrode (cathode) of the fuel cell 1 by the oxidizer gas supply system is introduced to the fuel electrode of the fuel cell 1, is adopted. It is also possible to adopt a configuration in which a part of the hydrogen gas flowing through the pipe 8 is introduced to the air electrode.

By using one or more temperature elevating methods as described above, the ECU 33 attempts to elevate the temperature of (warm up) the fuel cell 1. During the warm-up, the ECU 33 controls the three-way valve 24 to allow the coolant to flow through the second route (route for bypassing the radiator 23) or stops the pump 25 to enable the prevention of inhibition of the temperature elevation of the fuel cell 1.

By the operation of elevating the temperature of the fuel cell 1 (warm-up operation) as described above, the temperature of the fuel cell 1 is increased to a temperature higher than the boiling point of the odorant (80.7° C. in this example). For this reason, the temperature equal to or higher than the boiling point of the odorant is set as the threshold value Ts. As a result, at least a part of the odorant solidified or deposited in the fuel cell 1 is vaporized to be discharged to the outside (pipe 9) of the fuel cell 1 in such a way that the odorant is pushed out by the hydrogen gas. Further, the temperature equal to or higher than the threshold value Ts is made to last for a predetermined time of t_HT to ensure a time sufficient for vaporizing the odorant.

In Step S113, the ECU 33 judges, for example, whether or not the ignition coil (IG) becomes OFF (whether or not the OFF signal of the IG is received) to judge whether or not to terminate the operation of the fuel cell 1. When the condition in Step S113 is satisfied (S113; YES), the current value of the low-temperature timer is stored in the non-volatile memory 34 as a value at the previous termination (Step S114). Then, the processing is terminated. On the other hand, when the condition in Step S113 is not satisfied (S113; NO), the processing returns to Step S102 to be continued.

Figure 3:
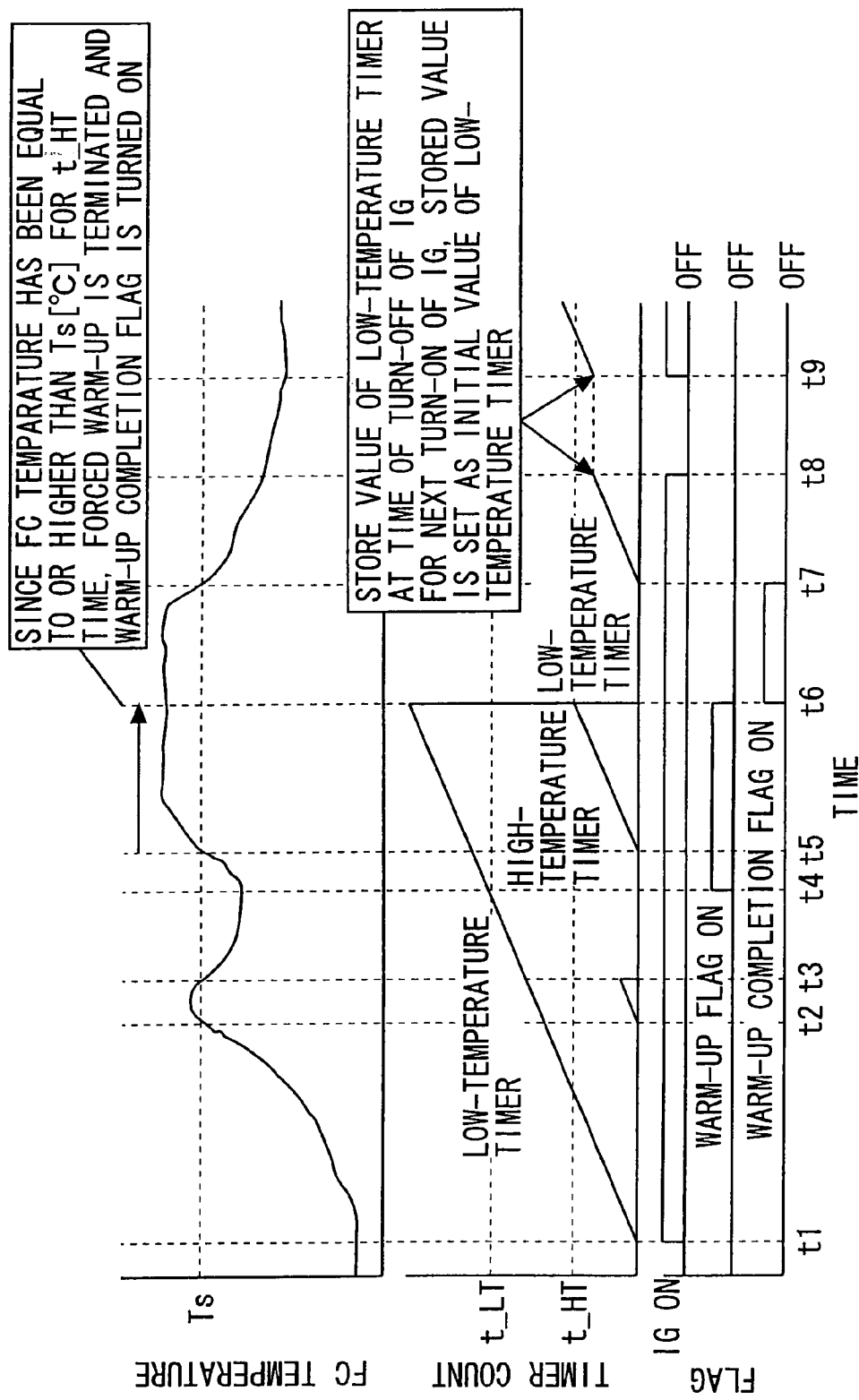
FIG. 3 is a time chart according to the control example 1.

FIG. 3 is a time chart according to the control example 1, and illustrates, in time series, the flags (IG flag, warm-up flag, and warm-up completion flag), the timer count values of the low-temperature and high-temperature timers, and the temperature of the fuel cell 1 (FC temperature) which are plotted in parallel.

In FIG. 3, when the IG flag is turned ON to start the fuel cell 1 at a time t1, the low-temperature timer starts counting (timing) (S102). Thereafter, when an FC temperature Tfc is elevated by the power generation of the fuel cell 1 to exceed the threshold value Ts at a time t2 (YES in S105), the high-temperature timer starts counting (timing) (S106).

Thereafter, when the FC temperature Tfc becomes less than the threshold value Ts while the count value of the high-temperature timer does not exceed the threshold value t_HT (time t3: NO in Step 105), the high-temperature timer is reset (S107).

Thereafter, when the count value of the low-temperature timer exceeds the threshold value t_LT at a time t4 (YES in S103), the solidification and the deposition of the odorant in the fuel cell 1 are estimated. In order to vaporize the odorant, the warm-up flag is set to ON (S104). Then, the ECU 33 performs control (warm-up operation control) for forcibly elevating the FC temperature Tfc in response to turn-ON of the warm-up flag. While the warm-up flag is ON, the warm-up operation control is continued.

As a result, when the FC temperature Tfc is elevated to be the threshold value Ts or higher (time t5: YES in S105), the high-temperature timer is caused to start counting (S106). When the count value of the high-temperature timer exceeds the threshold value t_HT (time t6: YES in S108), the warm-up completion flag is set to ON (S109). Then, the low-temperature and high-temperature timers are reset, whereas the warm-up flag is set to OFF (S111). As a length of the threshold value t_HT, a time sufficient for vaporizing the odorant deposited in the fuel cell 1, which is obtained through an experiment or the like, is set.

Thereafter, when the FC temperature Tfc becomes less than the threshold value Ts at a time t7 (NO in S105), the warm-up completion flag is set to OFF (S107). Through Steps S108, S110, S112, and S113, the low-temperature timer is caused to restart counting (S102). Thereafter, at a time t8, when OFF of the IG (stop of the fuel cell 1) is judged in Step S113 before the count value of the low-temperature timer exceeds the threshold value t_LH, the ECU 33 stores the count value of the low-temperature timer at this time in the non-volatile memory 34 (S114).

Thereafter, when the IG is turned ON again at a time t9, the count value of the low-temperature timer, which is stored in the non-volatile memory 34, is set as the initial value of the low-temperature timer (S101). Specifically, a configuration is such that the count value of the low-temperature timer is not reset even if the fuel cell 1 is stopped as long as the warm-up completion flag does not become ON. Therefore, even if the fuel cell 1 is stopped before the FC temperature Tfc exceeds the threshold value Ts and the odorant residing in the fuel cell 1 is solidified in the fuel cell 1, such an odorant can be vaporized in the early stage to be discharged from the fuel cell 1.

According to the control example 1, when the low-temperature state in which the FC temperature Tfc is less than the predetermined temperature (threshold value Ts) continues longer than the predetermined time (threshold value t_LT) while the fuel cell 1 is in the operating state, the deposition of the odorant is estimated to perform the forced warm-up operation regardless of whether or not the stop time of the fuel cell 1 is included in the operating state. As a result, the odorant liquefied or solidified in the fuel cell 1 can be vaporized to be discharged from the fuel cell 1. Therefore, the odorant deposited in the fuel cell 1 can be restrained from inhibiting the power generation.

Moreover, in the forced warm-up operation, the time during which the FC temperature Tfc is equal to or higher than the boiling point of the odorant is continued for the given time (threshold t_HT). As a result, the odorant liquefied or solidified in the fuel cell 1 can be appropriately vaporized.

Moreover, the count value of the low-temperature timer is not reset by the stop of the fuel cell 1. When the accumulative count value of the low-temperature timer (integrated value of the count value) reaches a predetermined time (threshold value t_LT), the forced warm-up operation is carried out. As a result, for example, even when a user of the vehicle uses the vehicle (fuel cell) to repeat a short-distance vehicle operation (short trip), the operation time during which the temperature does not reach the predetermined temperature (threshold value Ts) can be grasped (counted). Therefore, the odorant liquefied or solidified in the fuel cell 1 can be vaporized to enable the inhibition of deposition.

CONTROL EXAMPLE 2

Next, a second control example (control example 2) for estimating the deposition of the odorant to perform the forced warm-up operation by the ECU 33 will be described. The schema of a configuration according to the control example 2 is as follows.

(1) A unit (for example, temperature sensor 37) configured to measure the temperature of the fuel cell, a unit (for example, HFM 5 or pressure sensor 38) configured to measure a hydrogen quantity supplied (supplied hydrogen quantity) to the fuel cell, an estimation unit (for example, ECU 33) configured to estimate the deposition of the odorant when the fuel cell 1 does not reach the predetermined temperature (threshold value Ts) or higher even though a predetermined hydrogen quantity is supplied, and a control unit (for example, ECU 33) configured to forcibly elevate the temperature of the fuel cell 1 when the deposition of the odorant is estimated are included.

(2) As in the control example 1, the forced warm-up operation is continued for a certain period of time (the warm-up operation is continued for the t_HT time) even after the temperature of the fuel cell 1 reaches the predetermined temperature (threshold value Ts).

(3) In the case where the operation of the fuel cell 1 is terminated before the temperature reaches the predetermined temperature (threshold value Ts), the supplied hydrogen quantity at the time of termination is stored in the storage device (non-volatile memory 34). At the restart, the supplied hydrogen quantity at the time of the previous termination of the operation is set as an initial value of the supplied hydrogen quantity.

Figure 4:
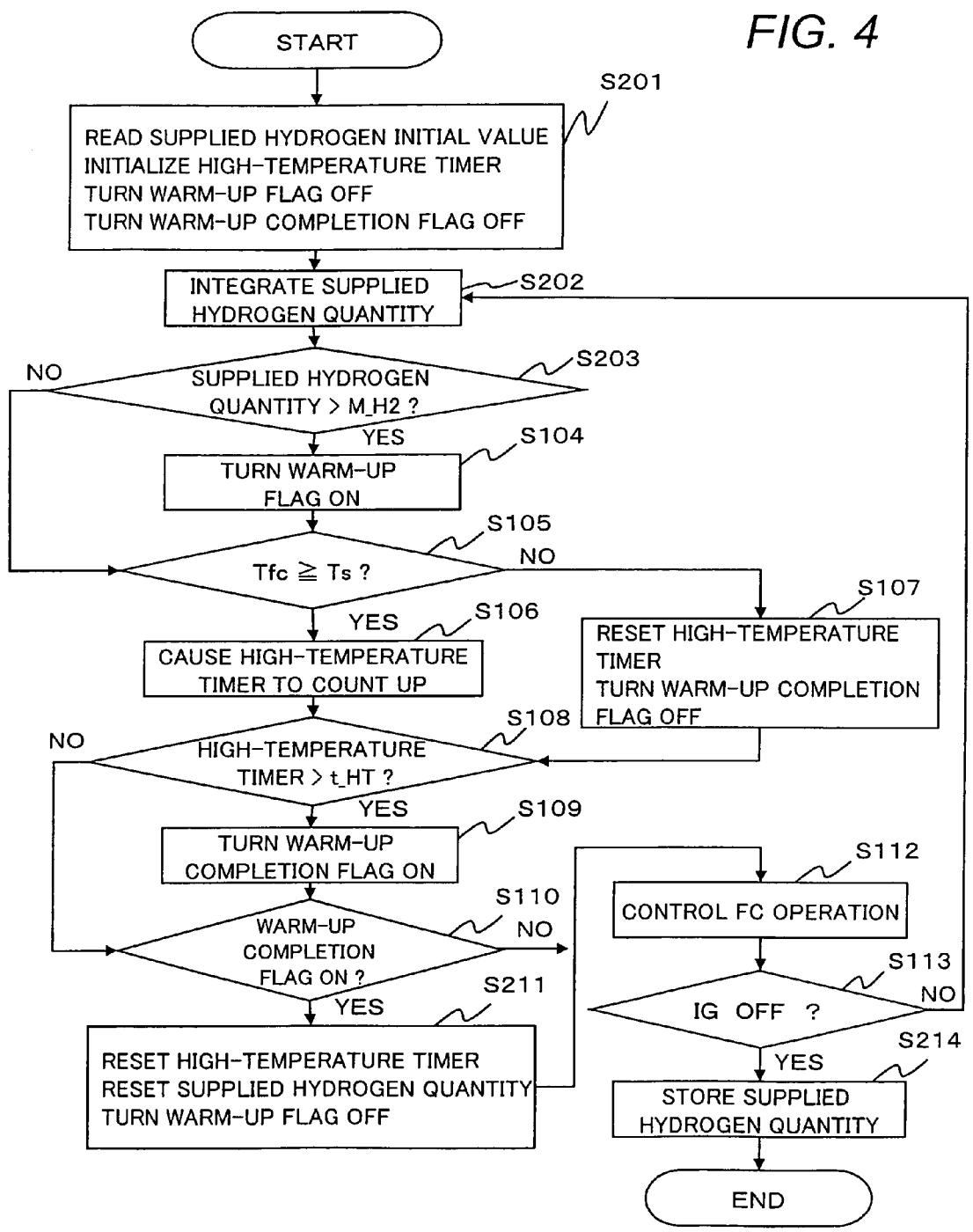
FIG. 4 is a flowchart illustrating an example (control example 2) of the forced warm-up operation control of the fuel cell based on the estimation of deposition of the odorant by the ECU.

FIG. 4 is a flowchart illustrating the control example 2 by the ECU 33. The ECU 33 includes the high-temperature timer (second timer) for carrying out the control example 2, and is configured to store the set values (ON/OFF) of the warm-up flag and the warm-up completion flag and the supplied hydrogen quantity (integrated value of hydrogen supplied to the fuel cell 1) on the storage device. Further, in the non-volatile memory 34 of the ECU 33, the supplied hydrogen quantity at the time of the previous termination (when the fuel cell 1 is stopped for the last time) is stored. Processing illustrated in FIG. 4 is started when, for example, the ignition coil (IG) of the vehicle is turned ON to start the fuel cell 1. Therefore, the ECU 33 is configured to receive the ON/OFF signal of the IG to store and manage the value indicating ON/OFF of the IG (IG flag value) in the storage device. Since the control example 2 includes the same processing as that in the control example 1, different processing will be mainly described.

When the IG becomes ON to start the fuel cell 1 to start the processing illustrated in FIG. 4, the warm-up flag, the warm-up completion flag, and the high-temperature timer are initialized. The supplied hydrogen quantity at the time of the previous termination, which is stored in the non-volatile memory 34, is read as an initial value of the supplied hydrogen quantity (Step S201).

In next Step S202, the ECU 33 integrates the supplied hydrogen quantity. In the case where the hydrogen flow meter (HFM 5) is used, the ECU 33 performs time integration of the measured value of the HFM 5 to obtain the integrated value of the supplied hydrogen quantity. The integrated value is stored on the storage device constituting the ECU 33.

In next Step 5203, the ECU 33 judges whether or not the supplied hydrogen quantity has exceeded a supplied hydrogen quantity threshold value M_H2. When the condition in Step S203 is satisfied (YES in S203), the ECU 33 turns the warm-up flag ON (Step S104). When the condition in Step S203 is not satisfied (S203; NO), the processing proceeds to Step S105. As described above, in the control example 2, the deposition of the odorant in the fuel cell 1 is estimated based on the satisfaction of the condition in Step S203.

Processing in Steps S105 to S110 is the same as that in the control example 1 (FIG. 2). Specifically, it is judged in Step S105 whether or not the FC temperature Tfc is equal to or higher than the predetermined temperature (threshold value Ts). When the FC temperature Tfc is equal to or higher than the threshold value Ts, the high-temperature timer is caused to start counting (S106). When the FC temperature Tfc is less than the threshold value Ts, the high-temperature timer is reset whereas the warm-up completion flag is turned OFF (S107). Moreover, it is judged in Step S108 whether or not the count value of the high-temperature timer has exceeded the given time (threshold value t_HT). When the count value has exceeded the threshold value t_HT, the warm-up completion flag is set to ON (S109). Then, it is judged in Step S110 whether or not the warm-up completion flag is ON.

When it is judged in Step S110 that the warm-up completion flag is ON (YES in S110), the high-temperature timer and the supplied hydrogen quantity are reset whereas the warm-up flag is set to OFF (Step S211).

In Step S112, as in the control example 1, the ECU 33 controls the operation of the fuel cell 1 according to the ON/OFF states of the warm-up flag and the warm-up completion flag. If the warm-up flag is ON and the warm-up completion flag is OFF at this time, the ECU 33 forcibly elevates the temperature of the fuel cell 1 by using the method described in the control example 1.

Thereafter, the ECU 33 judges whether or not to terminate the operation of the fuel cell 1 based on the judgment, for example, whether or not the IG has become OFF (Step S113). When the operation of the fuel cell 1 is not terminated (NO in S113), the processing is returned to Step S202 to be continued. On the other hand, when the operation of the fuel cell 1 is terminated (YES in S113), the current value of the supplied hydrogen quantity is stored in the non-volatile memory 34 (Step S214). Then, the processing of FIG. 4 is terminated.

Figure 5:
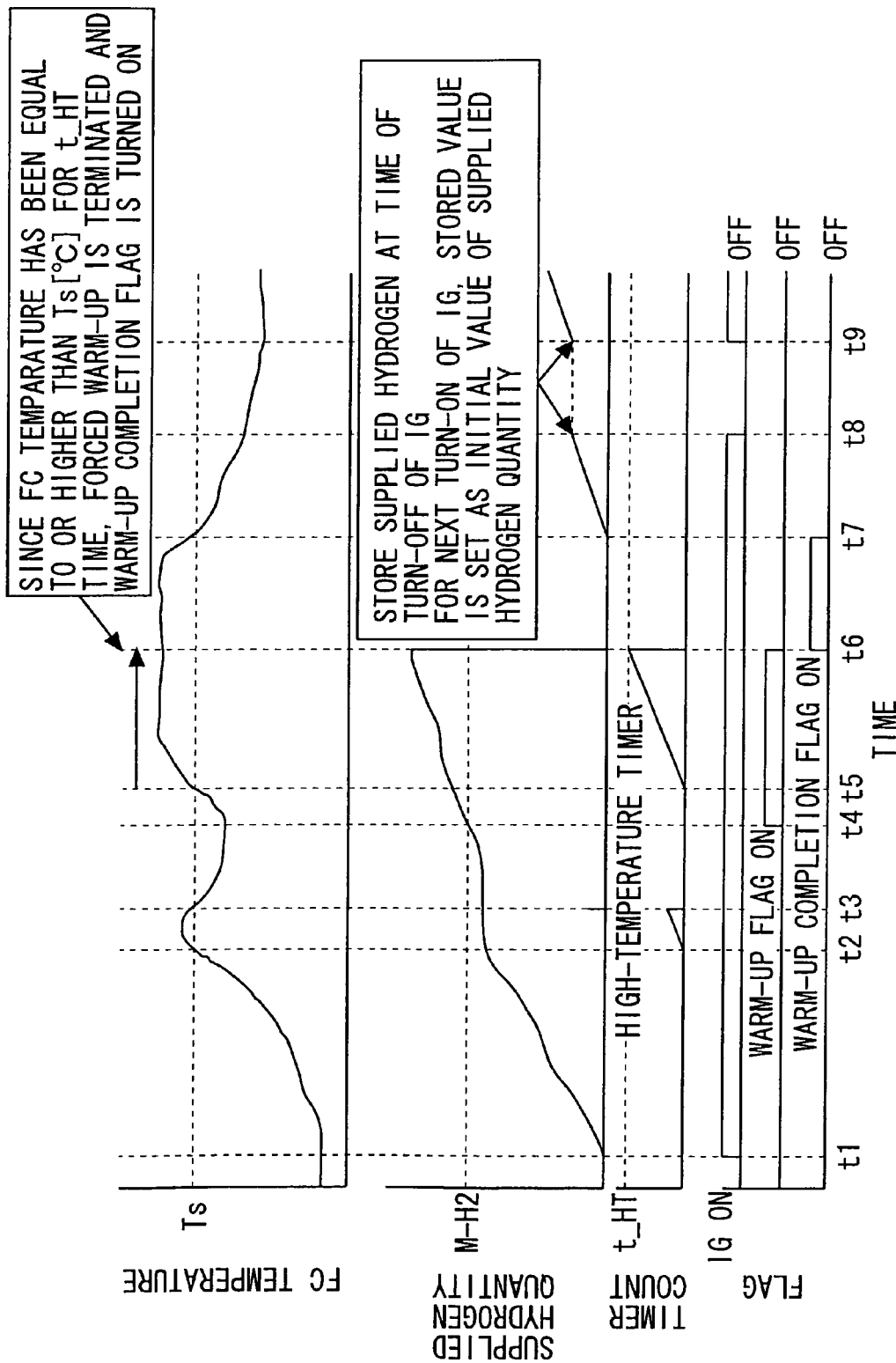
FIG. 5 is a time chart according to the control example 2.

FIG. 5 is a time chart according to the control example 2, and illustrates, in time series, the flags (IG flag, warm-up flag, and warm-up completion flag), the timer count value of the high-temperature timer, the supplied hydrogen quantity (for example, the integrated value of the measurement value of the HFM 5), and the temperature of the fuel cell 1 (FC temperature) which are plotted in parallel.

In FIG. 5, when the IG flag is turned ON to start the fuel cell 1 at the time t1, the measurement of the supplied hydrogen quantity is started (S202). Thereafter, when the FC temperature Tfc is elevated by the power generation of the fuel cell 1 to exceed the threshold value Ts at the time t2 (YES in S105), the high-temperature timer starts counting (S106).

Thereafter, when the FC temperature Tfc becomes less than the threshold value Ts while the count value of the high-temperature timer does not exceed the threshold value t_HT (time t3: NO in Step 105), the high-temperature timer is reset (S107).

Thereafter, when the supplied hydrogen quantity exceeds the threshold value M_H2 at the time t4 (YES in S203), the deposition of the odorant in the fuel cell 1 is estimated. In order to vaporize the odorant, the warm-up flag is set to ON (S104). Then, the ECU 33 performs the control (warm-up operation control) for forcibly elevating the FC temperature Tfc in response to turn-ON of the warm-up flag. While the warm-up flag is ON, the warm-up operation control is continued.

As a result, when the FC temperature Tfc is elevated to be the threshold value Ts or higher (time t5: YES in S105), the high-temperature timer is caused to start counting (S106). When the count value of the high-temperature timer exceeds the threshold value t_HT (time t6: YES in S108), the warm-up completion flag is set to ON (S109). Then, the supplied hydrogen quantity and the high-temperature timer are reset, whereas the warm-up flag is set to OFF (S211). As a length of the threshold value t_HT, a time sufficient for vaporizing the odorant deposited in the fuel cell 1 is obtained through the experiment or the like.

Thereafter, when the FC temperature Tfc becomes less than the threshold value Ts at the time t7 (NO in S105), the warm-up completion flag is set to OFF (S107). Through Steps S108, S110, S112, and S113, the measurement of the supplied hydrogen quantity is restarted (S202). Thereafter, at the time t8, when OFF of the IG (stop of the fuel cell 1) is judged in Step S113 before the supplied hydrogen quantity exceeds the threshold value M_H2, the ECU 33 stores the supplied hydrogen quantity at this time in the non-volatile memory 34 (S214).

Thereafter, when the IG is turned ON again at the time t9, the supplied hydrogen quantity, which is stored in the non-volatile memory 34, is set as the initial value (S201). Specifically, a configuration is such that the supplied hydrogen quantity is not reset even if the fuel cell 1 is stopped as long as the warm-up completion flag does not become ON. Therefore, even if the fuel cell 1 is stopped before the FC temperature Tfc exceeds the threshold value Ts and the odorant residing in the fuel cell 1 is solidified in the fuel cell 1, such an odorant can be vaporized in the early stage to be discharged from the fuel cell 1.

According to the control example 2, in the case where the FC temperature Tfc is less than the predetermined temperature (threshold value Ts) (is not equal to or larger than the threshold value Ts) at the time when the supplied hydrogen quantity exceeds the threshold value M_H2 while the fuel cell 1 is in the operating state, the deposition of the odorant is estimated to perform the forced warm-up operation regardless of whether or not the stop time of the fuel cell 1 is included in the operating state. As a result, the odorant liquefied or solidified in the fuel cell 1 can be vaporized to be discharged from the fuel cell 1. Therefore, the odorant deposited in the fuel cell 1 can be restrained from inhibiting the power generation.

Moreover, in the forced warm-up operation, the time during which the FC temperature Tfc is equal to or higher than the boiling point of the odorant is continued for the given time (threshold value t_HT). As a result, the odorant liquefied or solidified in the fuel cell 1 can be appropriately vaporized.

Moreover, the supplied hydrogen quantity is not reset by the stop of the fuel cell 1. When the supplied hydrogen quantity reaches a predetermined quantity (threshold value M_H2), the forced warm-up operation is carried out. As a result, for example, even when the user of the vehicle uses the vehicle (fuel cell) to repeat the short-distance vehicle operation (short trip), the operation time during which the temperature does not reach the predetermined temperature (threshold value Ts) can be grasped. Therefore, the odorant liquefied or solidified in the fuel cell 1 can be vaporized to enable the inhibition of deposition.

In the control example 2 described above, the case where the hydrogen flow meter (HFM) 5 is used for measuring the hydrogen quantity has been described. It is apparent that a configuration for measuring a change in pressure in the hydrogen tank 2 by the pressure sensor 38 to allow the ECU 33 to obtain the supplied hydrogen quantity from the change in pressure (reduction in pressure) can be adopted when the high-pressure hydrogen tank (hydrogen tank 2) is adopted as in the system illustrated in FIG. 1.

CONTROL EXAMPLE 3

Next, a third control example (control example 3) for estimating the deposition of the odorant to perform the forced warm-up by the ECU 33 will be described. The schema of a configuration according to the control example 3 is as follows.

(1) A unit (for example, temperature sensor 37) configured to measure the temperature of the fuel cell 1, a unit (for example, ammeter 30) configured to measure a current generated by the fuel cell, an estimation unit (for example, ECU 33) configured to estimate the deposition of the odorant when the temperature of the fuel cell 1 does not reach a predetermined temperature or higher even though an integrated value (integral) of the generated current exceeds a predetermined value, and a control unit (for example, ECU 33) configured to forcibly elevate the temperature of the fuel cell 1 when the deposition of the odorant is estimated are included.

(2) As in the control example 1, the forced warm-up operation is continued for a given period of time even after the temperature of the fuel cell 1 reaches the predetermined temperature.

(3) In the case where the operation of the fuel cell 1 is terminated before the generated current reaches a predetermined generated current integrated value, a generated current integrated value at the time of termination is stored in the storage device (for example, non-volatile memory 34). At the restart of the fuel cell 1, the generated current integrated value at the time of the previous termination of the operation is set as an initial value of the generated current integrated value.

Figure 6:
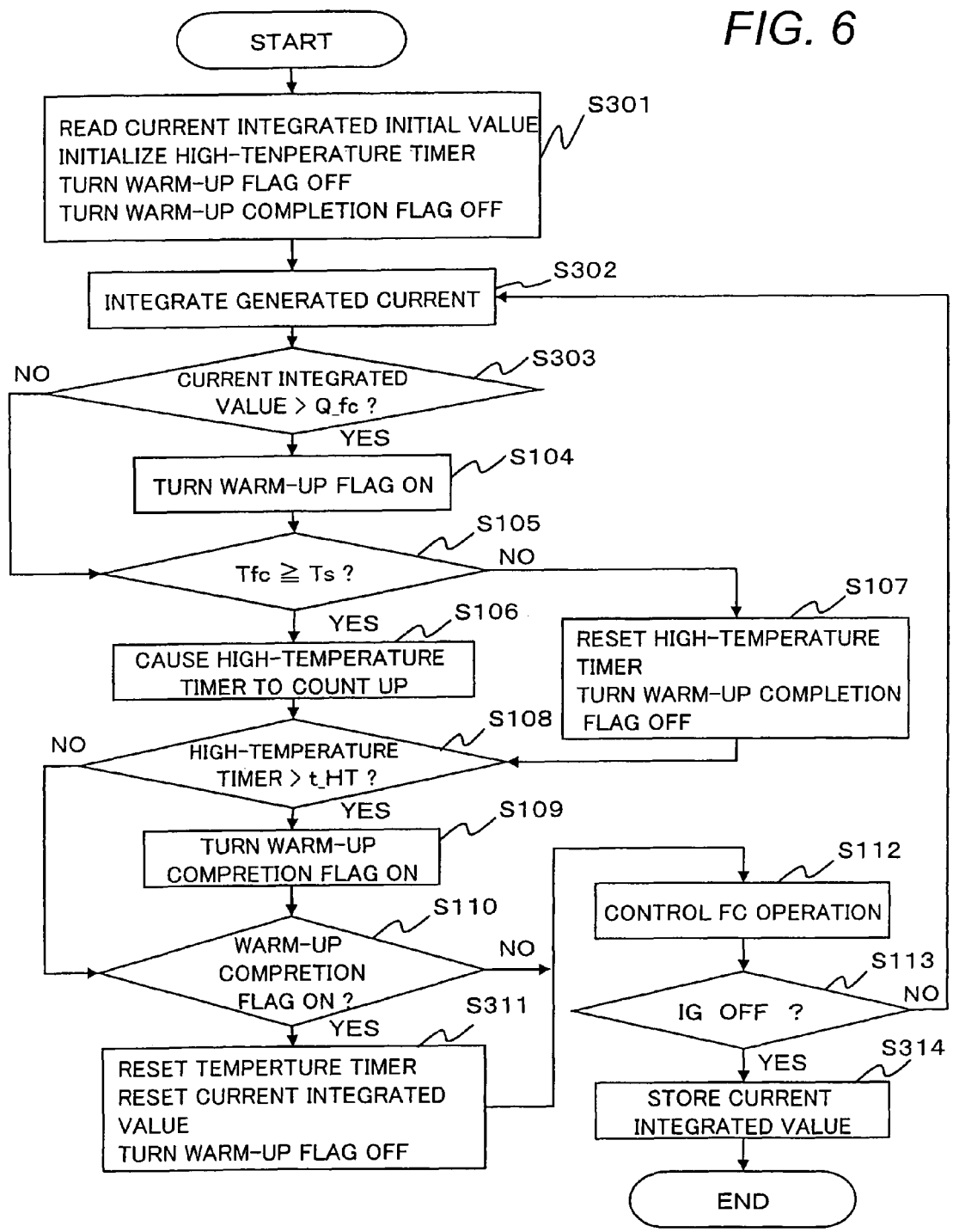
FIG. 6 is a flowchart illustrating an example (control example 3) of the forced warm-up operation control of the fuel cell based on the estimation of deposition of the odorant by the ECU.

FIG. 6 is a flowchart illustrating the control example 3 by the ECU 33. The ECU 33 includes the high-temperature timer (second timer) for executing the control example 3, and is configured to store the set values (ON/OFF) of the warm-up flag and the warm-up completion flag and the generated current integrated value (current integrated value) of the fuel cell 1 on the storage device. Further, in the non-volatile memory 34 of the ECU 33, the generated current integrated value at the time of the previous termination (when the fuel cell 1 is stopped for the last time) is stored. Processing illustrated in FIG. 6 is started when, for example, the ignition coil (IG) of the vehicle is turned ON to start the fuel cell 1. Therefore, the ECU 33 is configured to receive the ON/OFF signal of the IG to store and manage the value indicating ON/OFF of the IG (IG flag value) in the storage device. Since the control example 3 includes the same processing as that in the control example 1, different processing will be mainly described.

When the IG is set to ON to start the fuel cell 1 to start the processing illustrated in FIG. 6, the ECU 33 initializes the warm-up flag, the warm-up completion flag, and the high-temperature timer. The current integrated value at the time of the previous termination, which is stored in the non-volatile memory 34, is read as an initial value of the current integrated value (Step S301).

In next Step S302, the ECU 33 integrates the generated current (Step S302). Specifically, the ECU 33 calculates an integral (current integrated value) of the current value measured by the ammeter 30 to store the integral in the storage device.

Next, the ECU 33 judges whether or not the current integrated value has exceeded a current integrated value threshold value Q_fc (Step S303). When the current integrated value exceeds the threshold value Q_fc (YES in S303) at this time, the warm-up flag is turned ON (Step S104). In this manner, in the control example 3, the deposition of the odorant is estimated based on the satisfaction of the condition in Step S303. On the other hand, when the current integrated value does not exceed the threshold value Q_fc (NO in S303), the processing is caused to proceed to Step S105.

Steps S105 to S110 are the same as those in the control example 1. Specifically, it is judged in Step S105 whether or not the FC temperature Tfc is equal to or higher than the predetermined temperature (threshold value Ts). When the FC temperature Tfc is equal to or higher than the threshold value Ts (YES in S105), the high-temperature timer is caused to start counting (S106). When the FC temperature Tfc is less than the threshold value Ts (NO in S105), the high-temperature timer is reset whereas the warm-up completion flag is turned OFF (S107). Moreover, it is judged in Step S108 whether or not the count value of the high-temperature timer has exceeded the given time (threshold t_HT). When the count value exceeds the threshold value t_HT (YES in S108), the warm-up completion flag is set to ON (S109). Then, it is judged in Step S110 whether or not the warm-up completion flag is ON.

When the condition in Step S110 is satisfied, the ECU 33 resets the high-temperature timer, the warm-up flag, and the current integrated value (Step S311). Moreover, as in the control example 1, the ECU 33 controls the operation of the fuel cell 1 according to the ON/OFF states of the warm-up flag and the warm-up completion flag (Step S112). Specifically, when the warm-up flag is ON, the ECU 33 performs the forced warm-up operation by the same method as that in the control example 1. Further, as in the control example 1, the ECU 33 judges in Step S113 whether or not to terminate the operation of the fuel cell 1 (Step S113).

When the condition in Step S113 is satisfied (YES in S113), the ECU 33 stores the current integrated value in the non-volatile memory 34 (Step S314) to terminate the processing of FIG. 6. When the condition in Step S113 is not satisfied (NO in S113), the processing returns to Step S302 to be continued.

Figure 7:
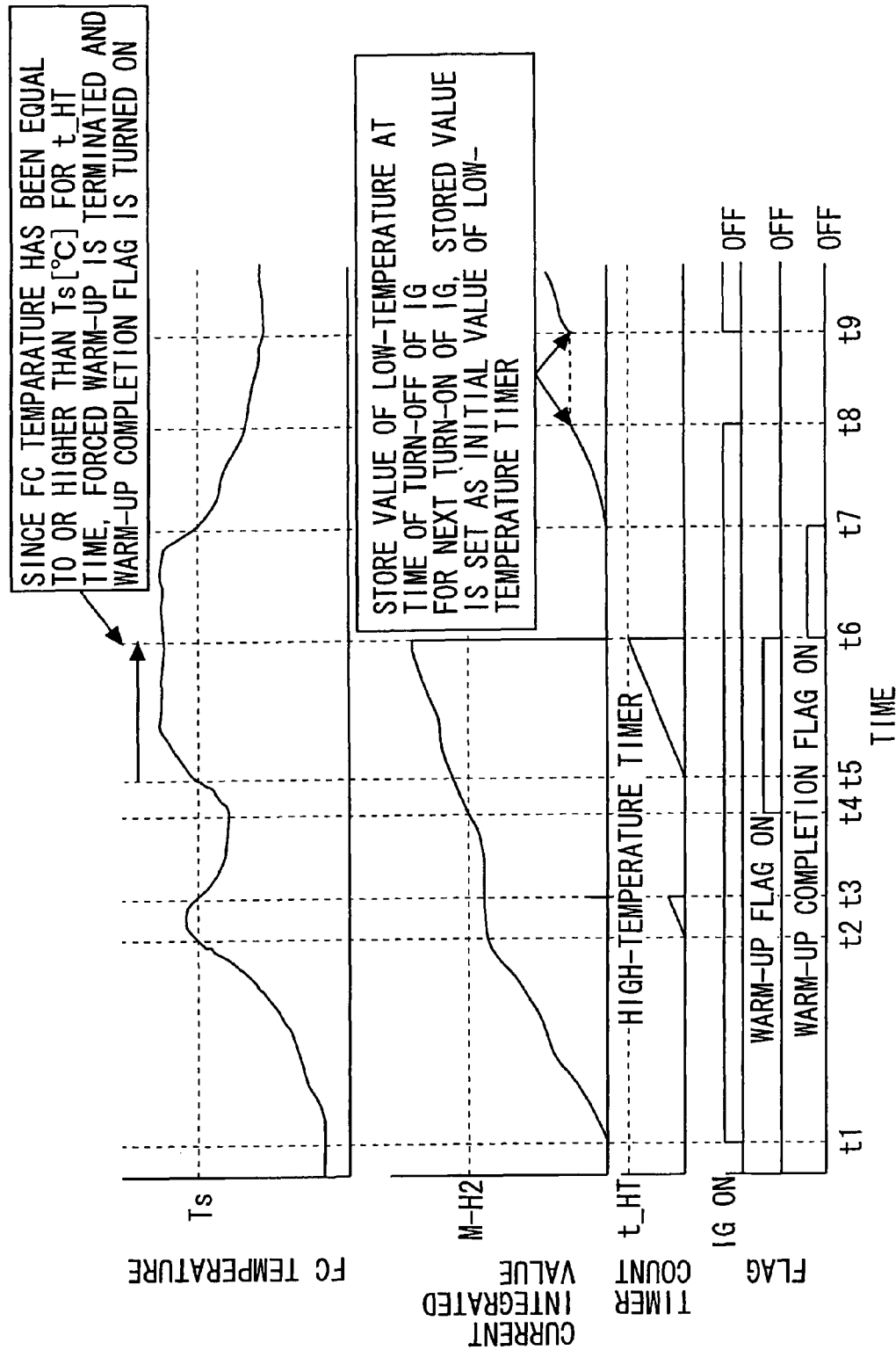
FIG. 7 is a time chart according to the control example 3.

FIG. 7 is a time chart according to the control example 3, and illustrates, in time series, the flags (IG flag, warm-up flag, and warm-up completion flag), the timer count value of the high-temperature timer, the current integrated value, and the temperature of the fuel cell 1 (FC temperature) which are plotted in parallel.

In FIG. 7, when the IG flag is turned ON to start the fuel cell 1 at the time t1, the measurement of the current integrated value is started (S302). Thereafter, when the FC temperature Tfc is elevated by the power generation of the fuel cell 1 to exceed the threshold value Ts at the time t2 (YES in S105), the high-temperature timer starts counting (S106).

Thereafter, when the FC temperature Tfc becomes less than the threshold value Ts while the count value of the high-temperature timer does not exceed the threshold value t_HT (time t3: NO in Step 105), the high-temperature timer is reset (S107).

Thereafter, when the current integrated value exceeds the threshold value Q_fc at the time t4 (YES in S303), the deposition of the odorant in the fuel cell 1 is estimated. In order to vaporize the odorant, the warm-up flag is set to ON (S104). Then, the ECU 33 performs the control (warm-up operation control) for forcibly elevating the FC temperature Tfc in response to turn-ON of the warm-up flag. While the warm-up flag is ON, the warm-up operation control is continued.

As a result, when the FC temperature Tfc is elevated to be the threshold value Ts or higher (time t5: YES in S105), the high-temperature timer is caused to start counting (S106). When the count value of the high-temperature timer exceeds the threshold value t_HT (time t6: YES in S108), the warm-up completion flag is set to ON (S109). Then, the current integrated value and the high-temperature timer are reset, whereas the warm-up flag is set to OFF (S311). As a length of the threshold value t_HT, a time sufficient for vaporizing the odorant deposited in the fuel cell 1 is obtained through the experiment or the like.

Thereafter, when the FC temperature Tfc becomes less than the threshold value Ts at the time t7 (NO in S105), the warm-up completion flag is set to OFF (S107). Through Steps S108, S110, S112, and S113, the measurement of the current integrated value is restarted (S302). Thereafter, at the time t8, when OFF of the IG (stop of the fuel cell 1) is judged in Step S113 before the current integrated value exceeds the threshold value Q_fc, the ECU 33 stores the current integrated value at this time in the non-volatile memory 34 (S314).

Thereafter, when the IG is turned ON again at the time t9, the current integrated value, which is stored in the non-volatile memory 34, is set as the initial value (S301). Specifically, a configuration is such that the current integrated value is not reset even if the fuel cell 1 is stopped as long as the warm-up completion flag does not become ON. Therefore, even if the fuel cell 1 is stopped before the FC temperature Tfc exceeds the threshold value Ts and the odorant residing in the fuel cell 1 is solidified in the fuel cell 1, such an odorant can be vaporized in the early stage to be discharged from the fuel cell 1.

According to the control example 3, in the case where the FC temperature Tfc is less than the predetermined temperature (threshold value Ts) (is not equal to or larger than the threshold value Ts) at the time when the current integrated value exceeds the threshold value Q_fc while the fuel cell 1 is in the operating state, the forced warm-up operation is performed regardless of whether or not the stop time of the fuel cell 1 is included in the operating state. As a result, the odorant liquefied or solidified in the fuel cell 1 can be vaporized to be discharged from the fuel cell 1. Therefore, the odorant deposited in the fuel cell 1 can be restrained from inhibiting the power generation.

Moreover, the time during which the FC temperature Tfc is equal to or higher than the boiling point (threshold value Ts) of the odorant is continued for the given time (threshold value t_HT). As a result, the odorant liquefied or solidified in the fuel cell 1 can be appropriately vaporized.

Moreover, the current integrated value is not reset by the stop of the fuel cell 1. When the current integrated value reaches a predetermined quantity (threshold value Q_fc), the forced warm-up operation is executed. As a result, for example, even when the user of the vehicle uses the vehicle (fuel cell) to repeat the short-distance vehicle operation (short trip), the operation time during which the temperature does not reach the predetermined temperature (threshold value Ts) can be grasped. Therefore, the odorant liquefied or solidified in the fuel cell 1 can be vaporized to enable the inhibition of deposition.

A configuration can be such that the current integrated value measured in the control example 3 is corrected with a cross-leak hydrogen quantity in the fuel cell 1 or a discharged hydrogen quantity from the fuel cell 1. In this manner, the accuracy of the current integrated value can be increased to carry out the forced warm-up operation based on the further accurate current integrated value.

CONTROL EXAMPLE 4

Figure 8:
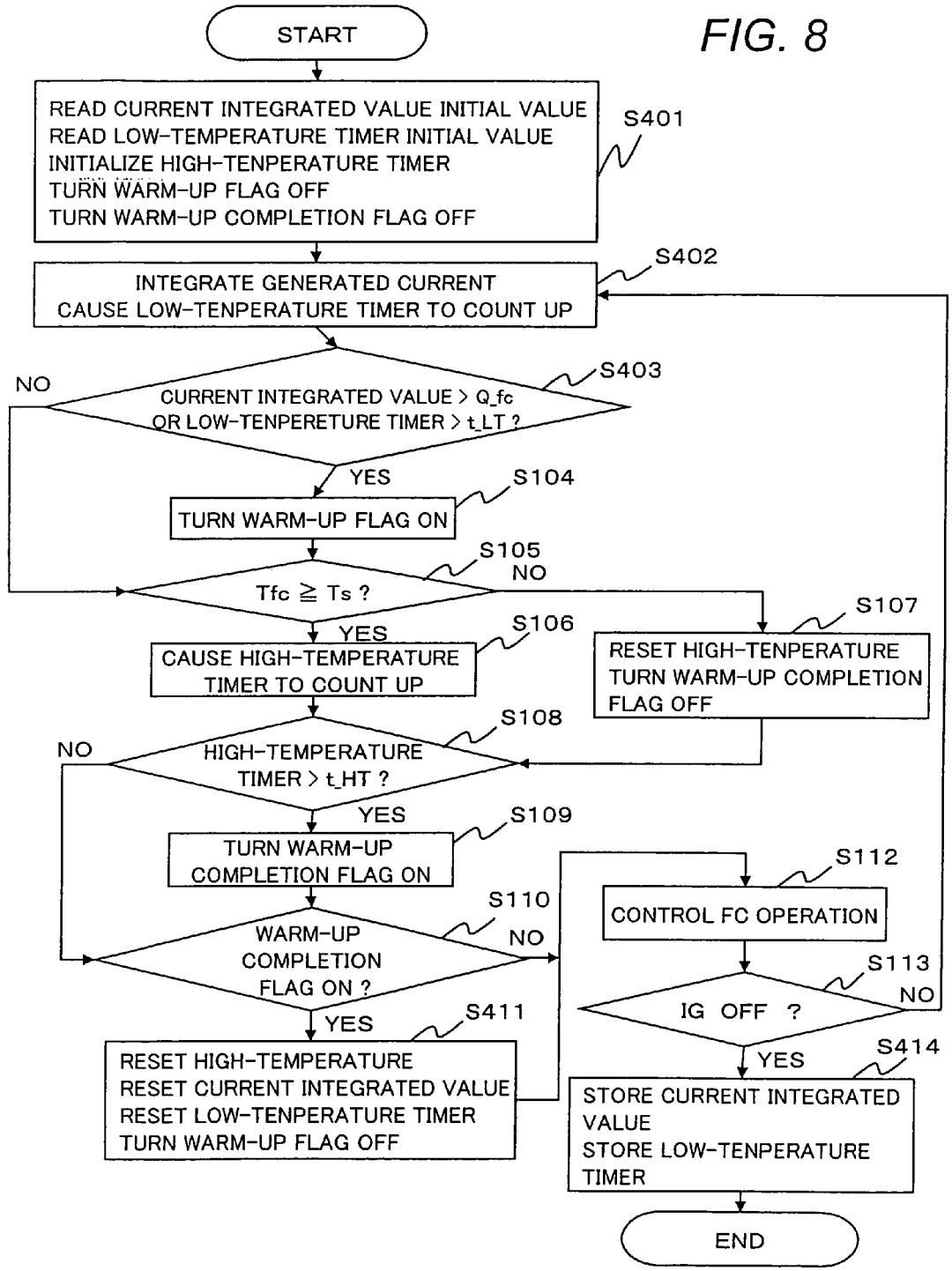
FIG. 8 is a flowchart illustrating an example (control example 4) of the forced warm-up operation control of the fuel cell based on the estimation of deposition of the odorant by the ECU.

As a control example 4 for the forced warm-up operation based on the estimation of the odorant deposition, the control example 1 and the control example 2 or 3 described above can be combined. FIG. 8 is a flowchart illustrating processing by the ECU 33 when the control examples 1 and 3 are combined (control example 4). As a configuration for carrying out the control example 4, the configuration for carrying out the control examples 1 and 3 as described above is employed.

When the IG of the vehicle is turned ON to start the fuel cell 1, the processing illustrated in FIG. 8 is started. At the start of the fuel cell 1, the ECU 33 initializes the warm-up flag, the warm-up completion flag, and the high-temperature timer. Moreover, as initial values of the low-temperature timer and the current integrated value, the ECU 33 reads each of the values at the time of the previous termination, which are stored in the non-volatile memory 34 (Step S401).

In Step S402, the ECU 33 integrates the generated current and causes the low-temperature timer to start counting. In Step S403, the ECU 33 judges whether or not the current integrated value has exceeded the current integrated value threshold value M_fc or the low-temperature timer has exceeded the low-temperature duration time threshold value t_LT (Step S403). When the condition in Step S403 is satisfied, the ECU 33 turns the warm-up flag ON (Step S104). Hereinafter, the processing in Steps S105 to S110 is the same as that in the control examples 1 and 3.

When the condition in Step S110 is satisfied (YES in S110), the ECU 33 resets the high-temperature timer, the low-temperature timer, and the current integrated value, and sets the warm-up flag to OFF (Step S411). Moreover, as in the control examples 1 and 3, the operation of the fuel cell 1 is controlled according to the ON/OFF states of the warm-up flag and the warm-up completion flag (Step S112) to perform the forced warm-up operation as needed.

Moreover, the ECU 33 judges whether or not to terminate the operation of the fuel cell 1 (Step S113). When the condition in Step S113 is satisfied, the current integrated value and the count value of the low-temperature timer are stored in the non-volatile memory 34 (Step S414). When the condition in Step S113 is not satisfied, the processing returns to Step S402 to be continued.

According to the control example 4, the functions and effects as those described in the control examples 1 to 3 can be obtained. Further, according to the control example 4, if the generation of a small current is continued in the case where the concentration of the odorant for hydrogen to be supplied to the fuel cell 1 is not sufficiently managed to result in the supply of the odorant at high concentration, there is a possibility that the odorant is excessively deposited in the fuel cell 1 before the current value reaches the supposed current integrated threshold value to obstruct the power generation. At this time, by providing a guard based on the time during which the power is generated at low temperature (performing the forced warm-up operation based on the low-temperature timer count value), the problem can be avoided.

Moreover, even when a variation in the amount of deposited odorant between the cells differs for each cell due to a variation in flow rate between the cells in the fuel cell 1, the provision of the time guard (the execution of the forced warm-up operation based on the low-temperature timer count value) is effective for restraining the excessive deposition of the odorant.

As the control example 4, the forced warm-up operation can also be controlled by the combination of the control examples 1 and 2. Moreover, the forced warm-up operation by the combination of the examples 2 and 3 or the control examples 1, 2, and 3 is also possible.

<Others>

In this embodiment, the configuration example (FIG. 1) of the fuel cell system executable by selecting any one of the control examples 1 to 4 has been described. The fuel cell system can be configured to carry out at least one of the control examples 1 to 4. When only the control example 1 is carried out, for example, the HFM 5, the pressure sensor 38, and the ammeter 30 can be omitted from the configuration illustrated in FIG. 1. When only the control example 2 is carried out, the ammeter 30 can be omitted from the configuration illustrated in FIG. 1. Moreover, one of the HFM 5 and the pressure sensor 38 can be omitted. When only the control example 3 is carried out, the HFM 5 and the pressure sensor 38 can be omitted.

Moreover, although the heater 36 for heating the pipe 8 is illustrated in FIG. 1, the heater 36 can be omitted when the heating of the fuel gas supplied to the fuel cell 1 is not adopted as a method of forcibly warming up the fuel cell 1.

The invention claimed is:

1. A fuel cell system, comprising:
   a hydrogen supply path for supplying odorant-added hydrogen to a fuel cell; and
   a controller programmed to:
     estimate deposition of an odorant in the fuel cell; and
     control the fuel cell system to elevate a temperature of the fuel cell to a temperature allowing at least a part of the odorant deposited in the fuel cell to be vaporized when the deposition of the odorant is estimated.

2. The fuel cell system according to claim 1, wherein the controller is programmed to count a time in which the temperature of the fuel cell does not exceed a predetermined temperature during an operation time of the fuel cell, and estimate the deposition of the odorant when a count value exceeds a predetermined time.

3. The fuel cell system according to claim 2, wherein the controller is programmed to keep the count value at a count value corresponding to when an operation of the fuel cell is stopped while the time is being counted, and restart counting the time while using the kept count value as an initial value when the operation of the fuel cell is thereafter restarted.

4. The fuel cell system according to claim 1, wherein the controller is programmed to measure an integrated value of a supplied hydrogen quantity to the fuel cell during the operation time of the fuel cell, and estimate the deposition of the odorant in a case where the temperature of the fuel cell does not exceed the predetermined temperature when the supplied hydrogen quantity integrated value reaches a predetermined value.

5. The fuel cell system according to claim 4, wherein the controller is programmed to keep the supplied hydrogen quantity integrated value at an integrated value corresponding to when the operation of the fuel cell is stopped during a measurement of the supplied hydrogen quantity integrated value, and restart measuring the supplied hydrogen quantity integrated value while using the kept supplied hydrogen quantity integrated value as an initial value when the operation of the fuel cell is thereafter restarted.

6. The fuel cell system according to claim 1, wherein the controller is programmed to measure a generated current integrated value of the fuel cell during an operation time of the fuel cell, and estimate the deposition of the odorant in a case where the temperature of the fuel cell does not exceed a predetermined temperature when the generated current integrated value reaches a predetermined value.

7. The fuel cell system according to claim 6, wherein the controller is programmed to keep the generated current integrated value at an integrated value corresponding to when an operation of the fuel cell is stopped during a measurement of the generated current integrated value, and restart measuring the generated current integrated value while using the kept generated current integrated value as an initial value when the operation of the fuel cell is thereafter restarted.

8. The fuel cell system according to claim 1, wherein the controller is programmed to warm up the fuel cell to continue a state where the temperature of the fuel cell is equal to or higher than the temperature allowing at least the part of the odorant to be vaporized for a predetermined time upon start of a temperature elevation of the fuel cell.

9. An odorant deposition estimating apparatus in a fuel cell, comprising:
    a controller programmed to:
        measure a temperature of the fuel cell during an operation; and
        use the measured temperature to estimate deposition of an odorant supplied together with hydrogen to the fuel cell in the fuel cell.

\* \* \* \* \*